United States Patent
Nosaka et al.

(10) Patent No.: US 12,254,632 B2
(45) Date of Patent: Mar. 18, 2025

(54) THERMAL IMAGE PROCESSING DEVICE, THERMAL IMAGE PROCESSING MODULE, THERMAL IMAGE PROCESSING METHOD, AND RECORDING MEDIUM

(71) Applicant: Panasonic Intellectual Property Management Co., Ltd., Osaka (JP)

(72) Inventors: Kenichiro Nosaka, Osaka (JP); Aki Yoneda, Hyogo (JP); Shinichi Shikii, Nara (JP); Mototaka Yoshioka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 406 days.

(21) Appl. No.: 17/780,803

(22) PCT Filed: Dec. 4, 2020

(86) PCT No.: PCT/JP2020/045332
§ 371 (c)(1),
(2) Date: May 27, 2022

(87) PCT Pub. No.: WO2021/117645
PCT Pub. Date: Jun. 17, 2021

(65) Prior Publication Data
US 2022/0414888 A1 Dec. 29, 2022

(30) Foreign Application Priority Data
Dec. 12, 2019 (JP) ................................. 2019-224490

(51) Int. Cl.
*G06T 7/11* (2017.01)
*G01J 5/48* (2022.01)
(Continued)

(52) U.S. Cl.
CPC ................. *G06T 7/11* (2017.01); *G01J 5/485* (2022.01); *H04N 5/33* (2013.01); *G01J 2005/0077* (2013.01); *G06T 2207/10048* (2013.01)

(58) Field of Classification Search
CPC .. G06T 5/70; G06T 8/20; G06T 7/001; H04N 23/11; H04N 23/951
See application file for complete search history.

(56) References Cited

U.S. PATENT DOCUMENTS

| | | | |
|---|---|---|---|
| 7,795,583 B1 * | 9/2010 | Hubbard ................... | G01J 5/08 250/338.1 |
| 8,203,606 B2 * | 6/2012 | Avila ..................... | G01N 25/72 348/130 |

(Continued)

FOREIGN PATENT DOCUMENTS

JP 2014-022845 A 2/2014

OTHER PUBLICATIONS

International Search Report issued on Feb. 22, 2021 in International Patent Application No. PCT/JP2020/045332, with English translation.

*Primary Examiner* — Yosef Kassa
(74) *Attorney, Agent, or Firm* — Rimon P.C.

(57) ABSTRACT

A thermal image processing device includes: an acquirer that acquires a thermal image from a thermal image sensor; a first processor that performs, on a high temperature pixel indicating a temperature higher than a first temperature among a plurality of pixels included in the thermal image acquired, image processing for decreasing the temperature indicated by the high temperature pixel; and a second processor that performs high frequency enhancement processing for enhancing a high frequency component included in a con- (Continued)

verted image serving as the thermal image on which the image processing has been performed.

15 Claims, 11 Drawing Sheets

(51) Int. Cl.
  *H04N 5/33* (2023.01)
  *G01J 5/00* (2022.01)

(56) References Cited

U.S. PATENT DOCUMENTS

| | | | | |
|---|---|---|---|---|
| 8,374,438 | B1 * | 2/2013 | Wagner | G06T 7/001 |
| | | | | 382/209 |
| 8,462,990 | B2 * | 6/2013 | Akashi | G06T 7/0004 |
| | | | | 382/108 |
| 8,792,968 | B2 * | 7/2014 | Xiao | A61B 5/015 |
| | | | | 382/128 |
| 9,251,615 | B2 * | 2/2016 | Schmidt | G06T 11/60 |
| 9,341,444 | B2 * | 5/2016 | Levine | G09F 7/00 |
| 10,116,885 | B2 * | 10/2018 | Beall | G06K 7/10297 |
| 10,119,885 | B2 * | 11/2018 | Higashiyama | F16C 33/6659 |
| 10,694,101 | B2 * | 6/2020 | Olsson | H04N 23/11 |

* cited by examiner

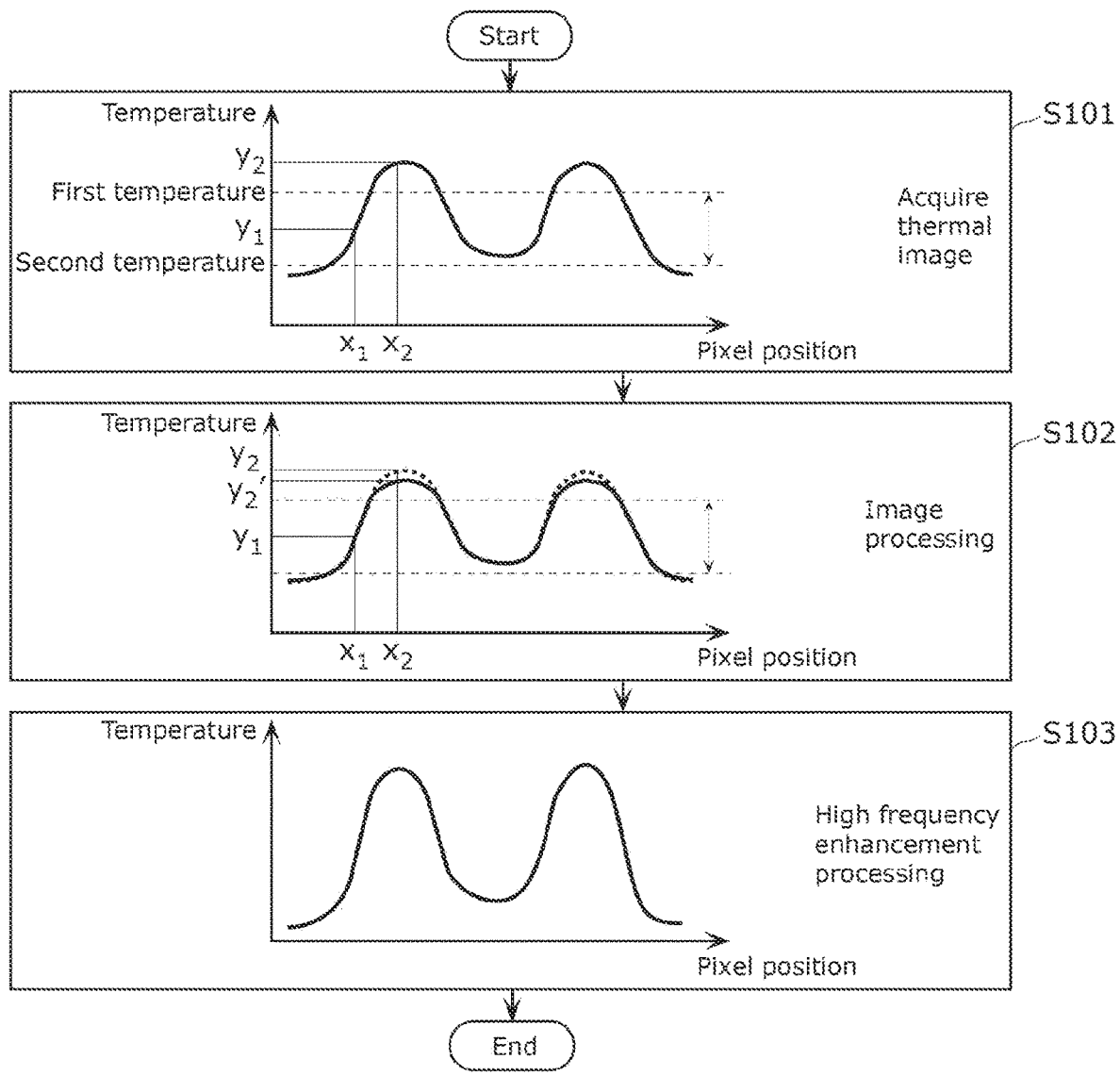

FIG. 8
(a)
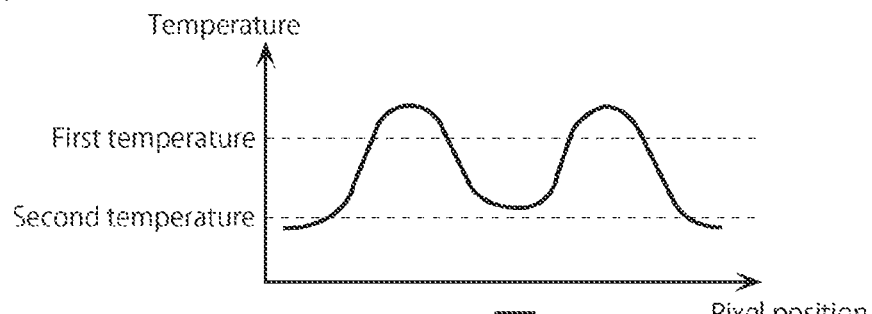
(b)
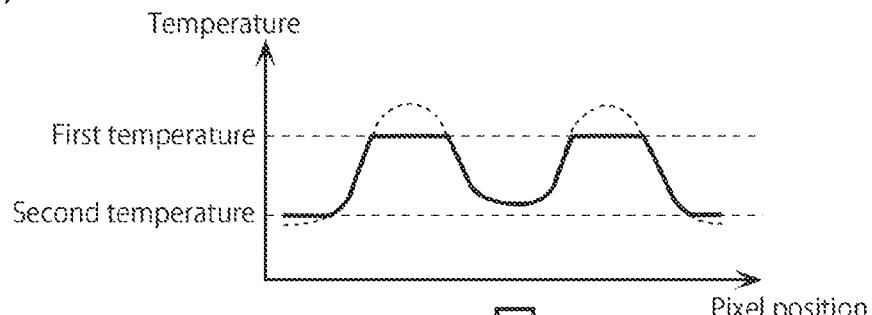
(c)
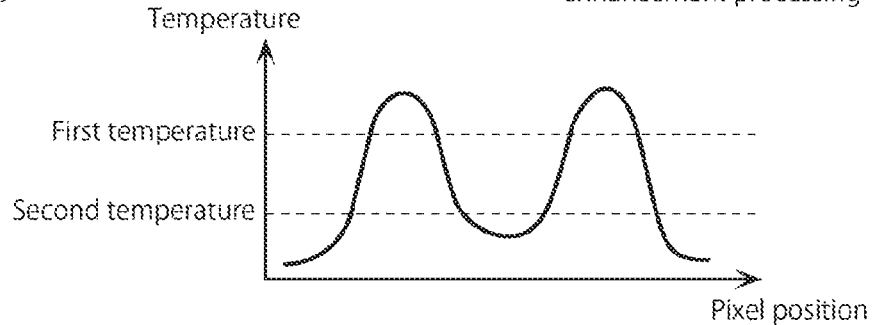

FIG. 9
(a)
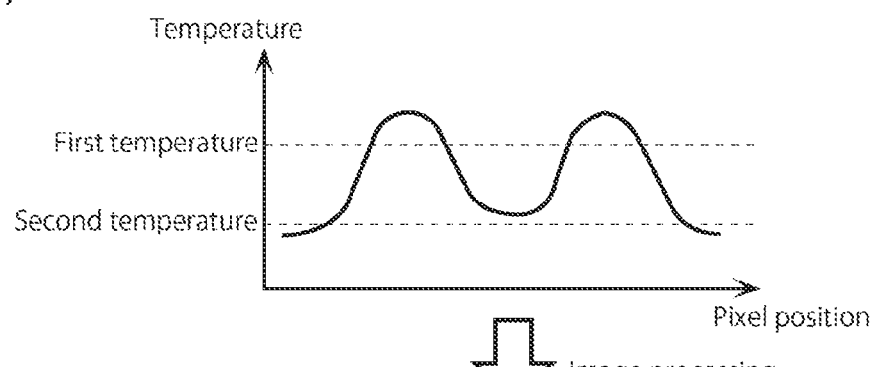
Image processing
(b)
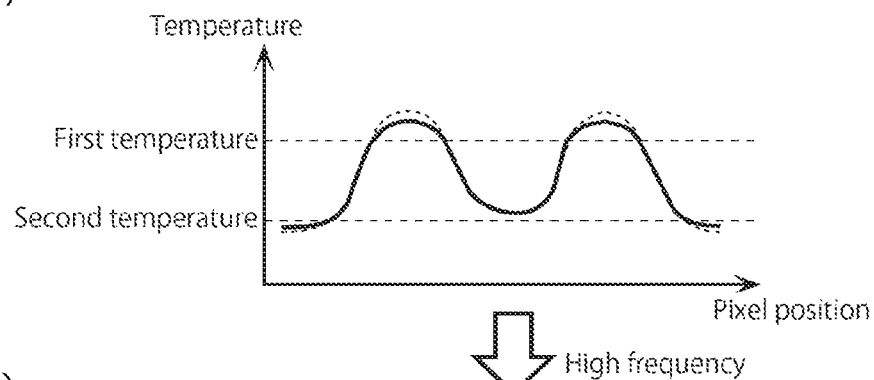
High frequency enhancement processing
(c)
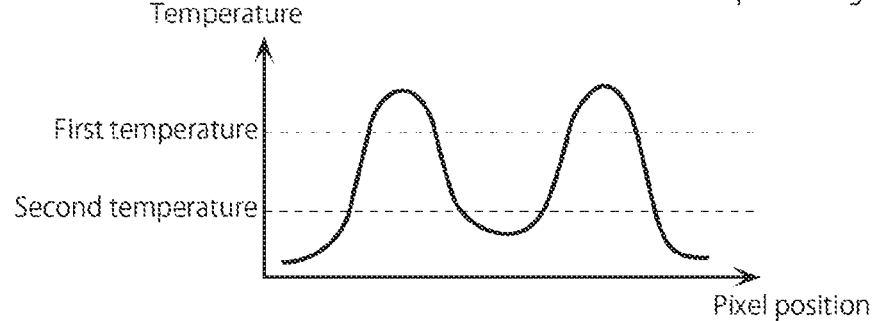

FIG. 11

| Operation mode name | First temperature | Second temperature |
|---|---|---|
| Living room mode | 40 °C | 20 °C |
| Vehicle interior mode | 50 °C | 10 °C |
| Person detection mode | 40 °C | 32 °C |
| Unconstrained mode | No setting | No setting |

THERMAL IMAGE PROCESSING DEVICE, THERMAL IMAGE PROCESSING MODULE, THERMAL IMAGE PROCESSING METHOD, AND RECORDING MEDIUM

CROSS-REFERENCE OF RELATED APPLICATIONS

This application is the U.S. National Phase under 35 U.S.C. § 371 of International Patent Application No. PCT/JP2020/045332, filed on Dec. 4, 2021, which in turn claims the benefit of Japanese Patent Application No. 2019-224490, filed on Dec. 12, 2019, the entire disclosures of which Applications are incorporated by reference herein.

TECHNICAL FIELD

The present disclosure relates to thermal image processing devices, thermal image processing modules, thermal image processing methods, and recording media.

BACKGROUND ART

Conventionally, a technique for controlling a device based on a thermal image detected with a thermal image sensor is known. Since a thermal image sensor corresponding to its cost is used, a thermal image which is detected may have a low resolution. In order to cope with this disadvantage, for example, a method for obtaining a thermal image whose spatial resolution is expanded by super-resolution processing as disclosed in patent literature (PTL) 1 is known.

CITATION LIST

Patent Literature

[PTL 1] Japanese Unexamined Patent Application Publication No. 2014-022845

SUMMARY OF INVENTION

Technical Problem

Incidentally, super-resolution processing can include high frequency enhancement processing for enhancing a high frequency component included in a thermal image. It is likely that in the high frequency enhancement processing as described above, a thermal image which is generated is not appropriate. Hence, the present disclosure provides a thermal image processing device and the like for generating a thermal image which is more appropriate.

Solution to Problem

In order to solve the problem described above, a thermal image processing device according to an aspect of the present disclosure includes: an acquirer that acquires a thermal image from a thermal image sensor; a first processor that performs, on a high temperature pixel indicating a temperature higher than a first temperature among a plurality of pixels included in the thermal image acquired, image processing for decreasing the temperature indicated by the high temperature pixel; and a second processor that performs high frequency enhancement processing for enhancing a high frequency component included in a converted image, the converted image being the thermal image on which the image processing has been performed.

A thermal image processing module according to an aspect of the present disclosure includes: the thermal image sensor; and the thermal image processing device described above.

A thermal image processing method according to an aspect of the present disclosure includes: acquiring a thermal image from a thermal image sensor; performing, on a high temperature pixel indicating a temperature higher than a first temperature among a plurality of pixels included in the thermal image acquired, image processing for decreasing the temperature indicated by the high temperature pixel; and performing high frequency enhancement processing for enhancing a high frequency component included in a converted image, the converted image being the thermal image on which the image processing has been performed.

A recording medium according to an aspect of the present disclosure is a non-transitory computer-readable recording medium having a program recorded thereon for causing a computer to execute the thermal image processing method described above.

Advantageous Effects of Invention

According to the present disclosure, images which are more appropriate are generated.

BRIEF DESCRIPTION OF DRAWINGS

FIG. 6 is a flowchart showing a thermal image processing method according to the embodiment.

FIG. 8 is a first diagram illustrating image processing in the embodiment.

FIG. 9 is a second diagram illustrating the image processing in the embodiment.

FIG. 11 is a diagram showing examples of a combination of a first temperature and a second temperature in the embodiment.

DESCRIPTION OF EMBODIMENTS

Background to Conception of Present Disclosure

Figure 1:
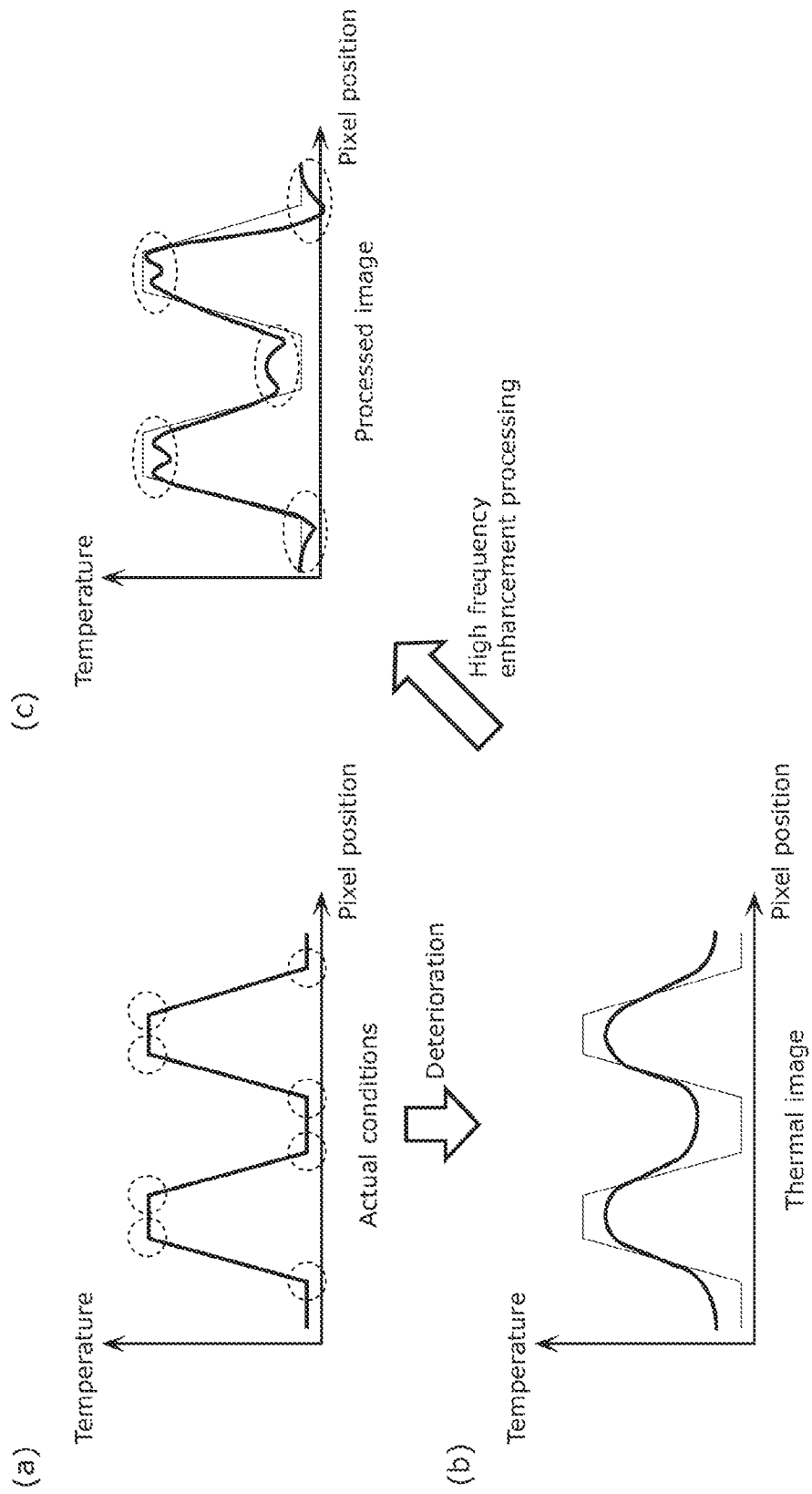
FIG. 1 is a diagram illustrating a problem when a high frequency component of a thermal image is enhanced.

Super-resolution processing is an image processing technique for estimating and generating, from a low-resolution image, a substantially original high-resolution image by calculation. In general, due to optical deterioration characteristics (such as blurring, downsampling, and noise) in a device or the like used for imaging an image, deterioration occurs in the resulting image. The super-resolution processing is known as one type of processing for restoring the deteriorated state of the resulting image as described above to the original high-resolution state.

As described above, the enhancement of the resolution of an image means that information lost by deterioration characteristics is compensated by estimation so as to be restored. For example, processing for restoring a high-resolution image from a deteriorated image often includes processing for compensating a high frequency component lost by deterioration characteristics though the image essentially needs to be observed. In other words, the super-resolution processing can often include high frequency enhancement processing for enhancing the high frequency component.

In particular, when an inexpensive thermal image sensor is used to image a thermal image, an optical system (a lens, a photosensitive element, and the like) having large deterioration characteristics is often used. In this case, it is necessary to more significantly enhance a high frequency component. Furthermore, since in a thermal image, the accuracy of the temperature of each pixel is lowered by deterioration, super-resolution processing or the like including high frequency enhancement processing is performed in order to enhance the accuracy of the temperature.

Here, when the high frequency enhancement processing is applied to the thermal image, the brightness value (that is, the temperature in the thermal image) of a pixel differs from the brightness values of adjacent pixels, and thus in a portion where a gradient is formed between the brightness values of pixels, undershoot and overshoot can occur. The undershoot is a phenomenon in which a rapid decrease in an input value in the high frequency enhancement processing causes a delay in the convergence of an output value, and thus the fluctuation of values including a value lower than an original value occurs over the surrounding pixels. The overshoot is a phenomenon in which a rapid increase in the input value in the high frequency enhancement processing causes a delay in the convergence of the output value, and thus the fluctuation of values including a value higher than the original value occurs over the surrounding pixels. In the high frequency enhancement processing, the undershoot and the overshoot cause so-called ringing as described above in an image space, and thus it is often necessary to cope with the ringing.

When the high frequency enhancement processing is applied to a steep gradient portion in which the brightness value of a pixel greatly differs from the brightness values of adjacent pixels, since a high frequency component is large in the steep gradient portion, in particular, the problem described above exerts a significant influence. In a device or the like which deals with thermal images, the temperature of each pixel is often important. Specifically, in the device or the like which deals with thermal images, as compared with a device or the like which deals with visible images, the accuracy of the brightness value of each pixel is required, with the result that the influence of the ringing as described above needs to be minimized.

When a parameter design is made such that whatever image is used as an input image in the high frequency enhancement processing, no ringing is generated, the effect of the enhancement of the high frequency component is inevitably reduced. On the other hand, in order to input any image as the input image in the high frequency enhancement processing while maintaining the effect of the enhancement of the high frequency component, it is necessary to make an appropriate parameter design for each image. This is not a realistic method.

It is likely that as described above, in the high frequency enhancement processing for thermal images, the application of a device or the like which deals with thermal images is clear. For example, in a device which uses thermal images to observe a human body under a normal temperature environment, a temperature difference between the human body and the surrounding environment is about several degrees Celsius, and thermal images having a temperature gradient as described above can be input. When an object, such as a lamp or a stove, whose temperature is extremely higher than the temperature of a human body is present over a certain number or more of pixels in a thermal image, a significant influence of the above-described ringing caused by the high frequency enhancement processing is exerted. Since the application of a device is limited, the upper limit of the brightness value of each pixel is often set low, and thus the brightness value is easily saturated by the presence of an object whose temperature is high. In such a case, the occurrence of the ringing caused by the high frequency enhancement processing is also problematic.

In the above-described example where a human body is observed, a temperature range to be accurately observed is generally limited. Specifically, a temperature range of about 20 to 40° C. including a comfortable room temperature, the temperature of a human body, and the like corresponds to the temperature range as described above. Although in the temperature range as described above, an accurate temperature needs to be observed, it is likely that even if the tolerance of the accuracy of a temperature to be observed is increased outside this temperature range, this increase does not affect the operation of the device and the like. In some cases, for a temperature above a certain level, it may be preferable to only know the fact that "the temperature is above the certain level". When as described above, the application of a thermal image which is acquired is clear, a specific range in which the accuracy of a temperature to be observed is required and the other range in which the accuracy is not required can be present.

The present disclosure relates to a thermal image processing device and the like which perform high frequency enhancement processing so as to perform a different type of processing either in a temperature range in which the accuracy of a temperature to be observed is ensured or outside the temperature range.

Outline of Present Disclosure

In order to solve the problem described above, a thermal image processing device according to an aspect of the present disclosure includes: an acquirer that acquires a thermal image from a thermal image sensor; a first processor that performs, on a high temperature pixel indicating a temperature higher than a first temperature among a plurality of pixels included in the thermal image acquired, image processing for decreasing the temperature indicated by the high temperature pixel; and a second processor that performs high frequency enhancement processing for enhancing a high frequency component included in a converted image, the converted image being the thermal image on which the image processing has been performed.

In the thermal image processing device as described above, before the high frequency enhancement processing which causes ringing in the thermal image is performed, a temperature difference in a steep gradient portion where a temperature change is large between pixels is reduced, with the result that the amplitude of the temperature serving as a factor for causing the occurrence of the ringing is suppressed. In this way, even when high frequency conversion processing is performed, since the amplitude of the temperature is suppressed, the occurrence of the ringing is suppressed. The processing as described above is performed on only the pixel which indicates the temperature higher than the first temperature, and the processing for suppressing the amplitude of the temperature is not applied to the pixel which indicates the temperature less than or equal to the first temperature. In other words, since on the pixel which indicates the temperature less than or equal to the first temperature, the high frequency enhancement processing is performed at the temperature as it is, the thermal image indicating a highly accurate temperature for the temperature less than or equal to the first temperature is generated. Hence, although in the thermal image processing device, the processing for suppressing the occurrence of the ringing is applied with the first temperature serving as a boundary, the thermal image processing device can generate a more appropriate thermal image which maintains the accuracy in the noted temperature range (that is, the temperature less than or equal to the first temperature).

For example, in the image processing, the first processor may further increase, on a low temperature pixel indicating a temperature lower than a second temperature among the plurality of pixels included in the thermal image acquired, the temperature indicated by the low temperature pixel, the second temperature being lower than the first temperature.

In this way, the processing for suppressing the occurrence of the ringing can also be performed on the pixel which indicates the temperature lower than the second temperature. Hence, although the processing for suppressing the occurrence of the ringing is applied to the pixel which indicates the temperature higher than the first temperature and the pixel which indicates the temperature lower than the second temperature, it is possible to generate a more appropriate thermal image which maintains the accuracy in the noted temperature range between the first temperature and the second temperature.

For example, the thermal image processing device may further include: an inputter through which at least one of the first temperature and the second temperature is set.

In this way, based on an input received in the inputter from a user, the first temperature and the second temperature are set. Since the first temperature and the second temperature can be set each time, thermal image processing device 100 can be applied to devices and the like of various applications using thermal images. In other words, the range to which thermal image processing device 100 is applied can be extended.

For example, in setting the at least one of the first temperature and the second temperature, the first temperature and the second temperature may be set according to one combination selected from a plurality of combinations of the first temperature and the second temperature.

In this way, a plurality of combinations of the first temperature and the second temperature which can be assumed according to the application are previously registered, the user only selects one combination from the plurality of combinations, and thus an appropriate combination of the first temperature and the second temperature is set. Since the operation performed by the user is only selecting one combination, the operation is simple. Hence, it is possible to enhance the ease of use of thermal image processing device 100.

For example, in the image processing: a low temperature difference value may be calculated by subtracting the second temperature from the temperature indicated by the low temperature pixel among the plurality of pixels included in the thermal image; and using a low temperature conversion algorithm that outputs a value higher than a value which is input, the temperature indicated by the low temperature pixel may be converted using a value which is output as a result of the low temperature difference value being input to the low temperature conversion algorithm.

In this way, in the pixel which indicates the temperature lower than the second temperature, based on the low temperature conversion algorithm, the temperature can be converted to a higher temperature. In other words, in the pixel which indicates the temperature lower than the second temperature, the processing for suppressing the occurrence of the ringing can be applied according to the low temperature conversion algorithm. Hence, it is possible to generate a more appropriate thermal image.

For example, in the image processing: a high temperature difference value may be calculated by subtracting the first temperature from the temperature indicated by the high temperature pixel among the plurality of pixels included in the thermal image; and using a high temperature conversion algorithm that outputs a value lower than a value which is input, the temperature indicated by the high temperature pixel may be converted using a value which is output as a result of the high temperature difference value being input to the high temperature conversion algorithm.

In this way, in the pixel which indicates the temperature higher than the first temperature, based on the high temperature conversion algorithm, the temperature can be converted to a lower temperature. In other words, in the pixel which indicates the temperature higher than the first temperature, the processing for suppressing the occurrence of the ringing can be applied according to the high temperature conversion algorithm. Hence, it is possible to generate a more appropriate thermal image.

For example, each of the low temperature conversion algorithm and the high temperature conversion algorithm may be a conversion function to which continuous values can be input.

In this way, even when any value is input, the processing for suppressing the occurrence of the ringing can be applied by calculation to the pixel which indicates the temperature higher than the first temperature and the pixel which indicates the temperature lower than the second temperature. Hence, it is possible to generate a more appropriate thermal image.

For example, each of the low temperature conversion algorithm and the high temperature conversion algorithm may be a conversion table in which input values are associated with output values.

In this way, the processing for suppressing the occurrence of the ringing can be applied, according to the input value, by referencing the conversion table, to the pixel which indicates the temperature higher than the first temperature and the pixel which indicates the temperature lower than the second temperature. Hence, it is possible to generate a more appropriate thermal image.

For example, in the conversion function, when the value input is 0, the value output may be 0, and when the value input is 0, a derivative value of the value output may be 1.

In this way, at temperatures around the first temperature and temperatures around the second temperature, that is, at boundary temperatures as to whether the processing for suppressing the occurrence of the ringing is applied, a rapid change in the value after the processing for suppressing the occurrence of the ringing is performed is suppressed. At temperatures around the first temperature and temperatures around the second temperature, the value after the processing for suppressing the occurrence of the ringing is performed can be suppressed to be discrete. Hence, even after the processing for suppressing the occurrence of the ringing is performed, in all the temperature range, the values are smoothly connected, with the result that it is possible to generate a more appropriate thermal image.

For example, the thermal image processing device may further include: a third processor that performs compensation processing including: calculating a difference image by calculating a difference between corresponding pixels of the acquired thermal image and the converted image; and adding corresponding pixels of the converted image on which the high frequency enhancement processing has been performed and the calculated difference image together.

In this way, the thermal image in which part of temperature information lost by the image processing of temperature conversion is added is generated. Hence, it is possible to generate a more appropriate thermal image.

For example, the second processor may further perform super-resolution processing for expanding a spatial resolution of the converted image.

In this way, it is possible to perform both the high frequency enhancement processing and the super-resolution processing in which the spatial resolution is expanded. Hence, the thermal image processing device can be applied to a device and the like for performing the super-resolution processing on thermal images.

A thermal image processing module according to an aspect of the present disclosure includes: the thermal image sensor; and any one of the thermal image processing devices described above.

In this way, a thermal image is imaged with the thermal image sensor and is processed with the thermal image processing device, and thus it is possible to generate a more appropriate thermal image.

For example, the thermal image processing module may further include: a display device that displays the converted image on which the high frequency enhancement processing has been performed as at least one of an image and temperature data.

In this way, the more appropriate thermal image which is generated can be displayed in at least one form of an image and temperature data.

A thermal image processing method according to an aspect of the present disclosure includes: acquiring a thermal image from a thermal image sensor; performing, on a high temperature pixel indicating a temperature higher than a first temperature among a plurality of pixels included in the thermal image acquired, image processing for decreasing the temperature indicated by the high temperature pixel; and performing high frequency enhancement processing for enhancing a high frequency component included in a converted image, the converted image being the thermal image on which the image processing has been performed.

In this way, before the high frequency enhancement processing which causes ringing in the thermal image is performed, a temperature difference in a steep gradient portion where a temperature change is large between pixels is reduced, with the result that the amplitude of the temperature serving as a factor for causing the occurrence of the ringing is suppressed. In this way, even when high frequency conversion processing is performed, since the amplitude of the temperature is suppressed, the occurrence of the ringing is suppressed. The processing as described above is performed on only the pixel which indicates the temperature higher than the first temperature, and the processing for suppressing the amplitude of the temperature is not applied to the pixel which indicates the temperature less than or equal to the first temperature. In other words, since on the pixel which indicates the temperature less than or equal to the first temperature, the high frequency enhancement processing is performed at the temperature as it is, the thermal image indicating a highly accurate temperature for the temperature less than or equal to the first temperature is generated. Hence, although in the thermal image processing device, the processing for suppressing the occurrence of the ringing is applied with the first temperature serving as a boundary, the thermal image processing device can generate a more appropriate thermal image which maintains the accuracy in the noted temperature range (that is, the temperature less than or equal to the first temperature).

A recording medium according to an aspect of the present disclosure is a non-transitory computer-readable recording medium having a program recorded thereon for causing a computer to execute the thermal image processing method described above.

In this way, the thermal image processing method described above can be performed with a computer.

Embodiments of the present disclosure will be described below with reference to drawings. The embodiments described below show comprehensive or specific examples of the present disclosure. Hence, values, constituent elements, the arrangement positions and connection form of the constituent elements, steps, the order of the steps, and the like which are shown in the embodiments below are examples and are not intended to limit the present disclosure. Therefore, among the constituent elements in the embodiments below, the constituent elements which are not recited in the independent claims of the present disclosure will be described as arbitrary constituent elements.

The drawings are schematic views and are not exactly shown. Hence, in the drawings, scales and the like are not exactly the same. In the drawings, substantially the same configurations are identified with the same reference signs, and repeated description thereof is omitted or simplified.

Embodiment

[High Frequency Enhancement Processing]

Ringing caused by high frequency enhancement processing will first be described with reference to FIG. 1. FIG. 1 is a diagram illustrating a problem when a high frequency component of a thermal image is enhanced. Each of (a) to (c) in FIG. 1 shows a change in temperature when a straight line is drawn on a two-dimensional surface of a thermal image which is acquired and then the temperatures (that is, the brightness values of the image) of pixels on the straight line are taken on the horizontal axis. (a) in FIG. 1 shows actual conditions in which the thermal image is acquired, and corresponds to an ideal thermal image which should be originally acquired.

As indicated by dashed circles in (a) in FIG. 1, the temperatures originally form edges which are bent from a high temperature portion to a low temperature portion to connect to each other. However, as described previously, in accordance with deterioration characteristics when the thermal image is acquired, as shown in (b) in FIG. 1, in the acquired thermal image, the edges collapse due to a phenomenon such as blurring, the low temperature portion is drawn to the high temperature portion and the high temperature portion is drawn to the low temperature portion, and thus a base line (zero point of brightness) is not stable. In particular, in a portion (steep gradient portion) where a temperature change is large, an original fluctuation in the brightness value is not maintained for this reason.

Hence, in general, high frequency enhancement processing is performed on the acquired thermal image to generate, as shown in (c) in FIG. 1, a thermal image close to the actual conditions by image processing. Here, in (c) in FIG. 1, ringing which is a waveform disturbance indicated by dashed ovals is generated. Since the occurrence of the ringing has been described previously, the description thereof is omitted, and in particular, in a portion where a temperature change is large, such a problem can occur. The influence of the ringing extends over the surrounding pixels, and this contributes to a reduction in the accuracy of brightness values including the pixels around the pixel in which the ringing occurs.

[Thermal Image Processing Module]

Figure 2:
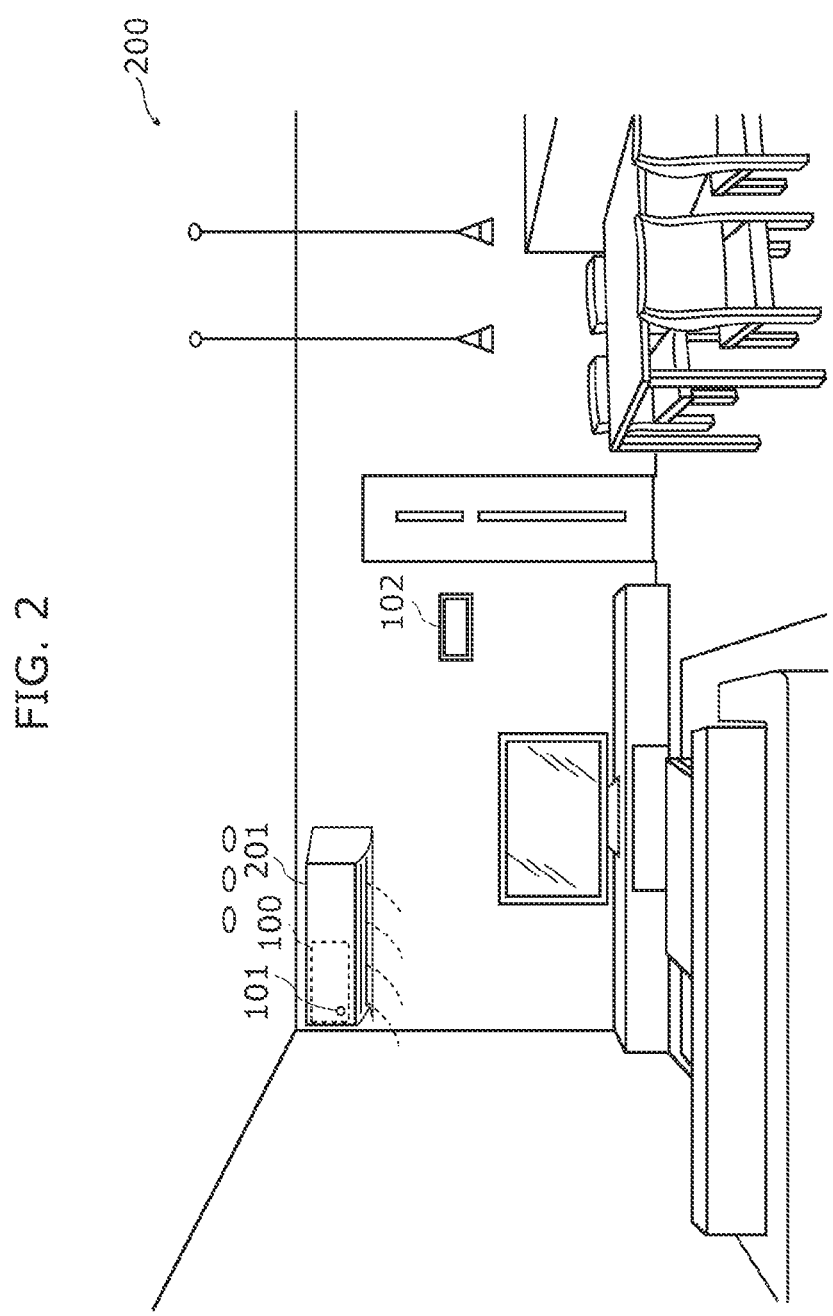
FIG. 2 is a schematic view showing an example of use of a thermal image processing device according to an embodiment.

An example of use of a thermal image processing device and a thermal image processing module in the present embodiment will be described with reference to FIG. 2. FIG. 2 is a schematic view showing the example of use of the thermal image processing device according to the embodiment. The example of use of the thermal image processing device and the thermal image processing module described here is shown as a convenient example, and is not intended to limit the applications of the thermal image processing device and the thermal image processing module. The thermal image processing device and the thermal image processing module can be applied to any application in which a thermal image is acquired and high frequency enhancement processing can be performed on the thermal image.

As shown in FIG. 2, thermal image processing device 100 is realized by being incorporated in, for example, air conditioning device 201 installed in living room 200 inside a house. A controller (not shown) is incorporated in air conditioning device 201, and the controller determines, based on a thermal image, an airflow in living room 200 produced by air conditioning device 201. Air conditioning device 201 uses a blower, a heating device, and a cooling device (all of which are not shown) to form the airflow determined by the controller.

Thermal image processing device 100 communicates with thermal image sensor 101 provided on the outer surface of air conditioning device 201 to acquire a thermal image from thermal image sensor 101, performs high frequency enhancement processing, and thereafter outputs, as an output image, the processed image which is the thermal image after the processing. The controller described above uses the processed thermal image serving as the output image output from thermal image processing device 100, thereby estimates, from the output image, air, an airflow, the position of a person, the hot and cold sensation of the person, and the like in living room 200, and determines the airflow in living room 200.

Thermal image sensor 101 is a device which images and outputs a thermal image, and in which detection elements for detecting infrared radiation emitted from a target are arranged in a two-dimensional plane. These detection elements respectively correspond to the pixels of the thermal image which is output. Hence, in thermal image sensor 101, the infrared radiation detected in the detection elements is arranged as brightness values corresponding to temperatures in a two-dimensional plane, and thus the thermal image is generated. As described previously, the thermal image as described above is output so as to differ from the actual conditions according to deterioration characteristics. As the deterioration characteristics of thermal image sensor 101 are larger, the greater effects of thermal image processing device 100 and the like in the present disclosure are exerted. In other words, by using thermal image processing device 100 and the like, it is possible to provide a wider range of choices of thermal image sensors 101 which are adopted in devices for dealing with thermal images.

The output image generated by thermal image processing device 100 is output not only to the controller of air conditioning device 201 described above but also to display device 102. Display device 102 displays the processed thermal image serving as the output image as at least one of an image and temperature data. For example, display device 102 is realized by being installed in the remote controller of air conditioning device 201. In display device 102, a display image is displayed on a display panel using liquid crystal, organic EL, micro LEDs, or the like, and thus the thermal image is displayed as at least one of an image and temperature data.

Figure 3:
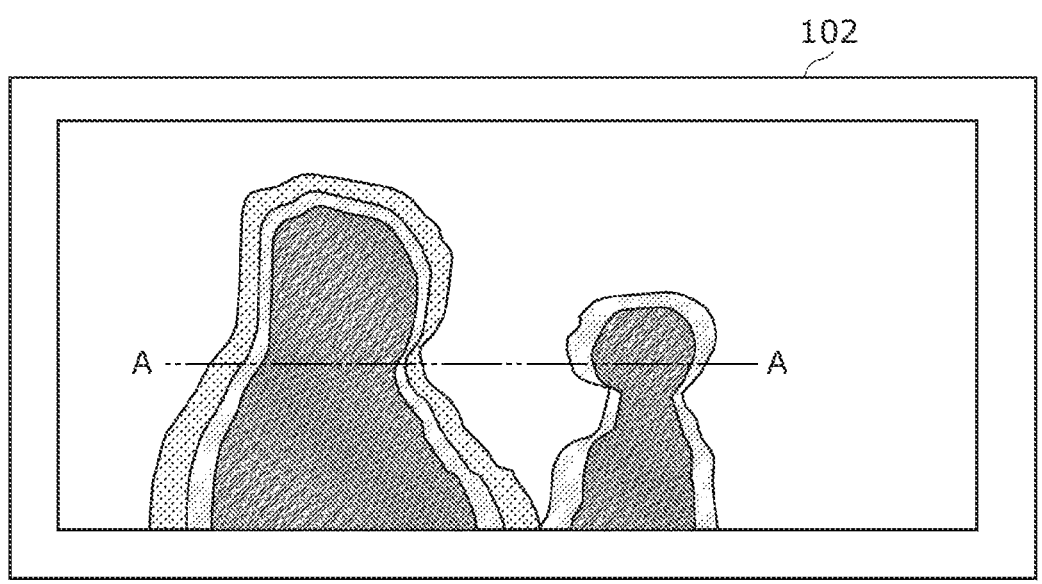
FIG. 3 is an enlarged view showing the appearance of a display device in the embodiment.

FIG. 3 is an enlarged view showing the appearance of the display device in the embodiment. In the display of the thermal image on display device 102, for example, as shown in FIG. 3, the thermal image may be simply displayed, and though the thermal image is displayed in the form of a heat flow or the like based on the temperature of a person who is present in living room 200, the room temperature of living room 200, and temperature differences of individual locations, the form of the display as described above is not particularly limited. Thermal image sensor 101 and thermal image processing device 100 described above may be combined with display device 102 to realize the thermal image processing module.

Figure 4:
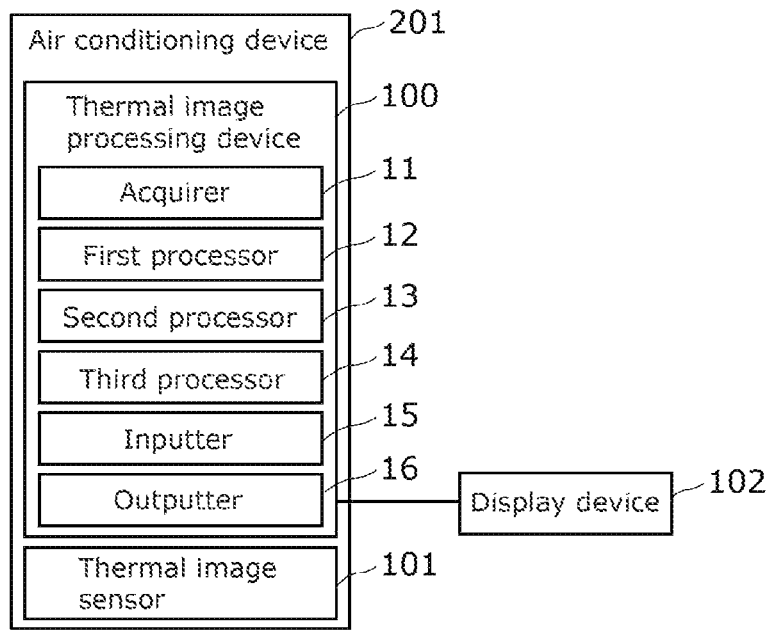
FIG. 4 is a block diagram showing a functional configuration of the thermal image processing device according to the embodiment.

Thermal image processing device 100 will be described in more detail below with reference to FIG. 4. FIG. 4 is a block diagram showing a functional configuration of the thermal image processing device according to the embodiment. As shown in FIG. 4, thermal image processing device 100 and thermal image sensor 101 are incorporated in air conditioning device 201, and thermal image processing device 100 and display device 102 installed in the remote controller are connected to be able to communicate with each other.

Thermal image processing device 100 includes acquirer 11, first processor 12, second processor 13, third processor 14, inputter 15, and outputter 16.

Acquirer 11 is a processor which acquires the thermal image from thermal image sensor 101. Acquirer 11 acquires, via a communication module connected to communicate with thermal image sensor 101, the thermal image output from thermal image sensor 101 without further processing the thermal image or by converting the thermal image to a form capable of being processed in the first processor which will be described later.

First processor 12 performs image processing for converting, among a plurality of pixels included in the acquired thermal image, the temperature of a high temperature pixel which indicates the temperature higher than a predetermined first temperature. Specifically, the first temperature is subtracted from the temperature indicated by the high temperature pixel, and thus a high temperature difference value which is a difference value therebetween is calculated.

First processor 12 uses a high temperature conversion algorithm which outputs a value lower than a value that is input to convert the temperature. The temperature indicated by the high temperature pixel is replaced by the converted temperature, and thus a converted image which is the thermal image subjected to the temperature conversion is output. Although the high temperature conversion algorithm will be specifically described later, the converted image is obtained in which in the high temperature pixel whose temperature is higher than the first temperature in the thermal image, its temperature is lowered by the processing on the high temperature pixel performed in first processor 12.

First processor 12 performs image processing for converting, among the plurality of pixels included in the acquired thermal image, the temperature of a low temperature pixel which indicates the temperature lower than a predetermined second temperature. Specifically, the second temperature is subtracted from the temperature indicated by the low temperature pixel, and thus a low temperature difference value which is a difference value therebetween is calculated. Since the low temperature difference value is obtained by subtracting the second temperature from the temperature which is indicated by the low temperature pixel and is lower than the second temperature, the low temperature difference value is a negative value.

First processor 12 uses a low temperature conversion algorithm which outputs a value higher than a value that is input to convert the temperature. The temperature indicated by the low temperature pixel is replaced by the converted temperature, and thus a converted image which is the thermal image subjected to the temperature conversion is output. Although the low temperature conversion algorithm will be specifically described later, the converted image is obtained in which in the low temperature pixel whose temperature is lower than the second temperature in the thermal image, its temperature is increased by the processing on the low temperature pixel performed in first processor 12.

As described above, by the image processing performed in first processor 12, a high temperature side is lowered and a low temperature side is increased except a temperature range between the first temperature and the second temperature, and thus the amplitude of the temperature of each pixel in the thermal image is decreased.

Second processor 13 performs, on the converted image serving as the thermal image on which the image processing has been performed in first processor 12, high frequency enhancement processing for enhancing a high frequency component included in the converted image. Any existing processing may be applied to the high frequency enhancement processing in second processor 13. By the high frequency enhancement processing in second processor 13, the high frequency component in the thermal image is restored, and thus the processed image close to the actual conditions is generated.

Third processor 14 complements the processed image after the high frequency enhancement processing in second processor 13 by supplying part of information (that is, the high temperature difference value and the low temperature difference value) lost by the image processing in first processor 12. Third processor 14 calculates a difference image by subtracting, from each other, pixels of the acquired thermal image and pixels of the converted image subjected to the image processing in first processor 12 that correspond to the pixels of the acquired thermal image. Third processor 14 also adds, to each other, pixels of the processed image and pixels of the difference image corresponding to the pixels of the processed image so as to perform compensation processing, and outputs the compensated image as the output image of thermal image processing device 100.

Inputter 15 is a processor for receiving inputs to thermal image processing device 100. Specifically, inputter 15 receives, from a user, as inputs, the first temperature and the second temperature used in first processor 12. The first temperature and the second temperature as described above may be arbitrarily set and input by the user or may be input at the stage of manufacturing a device or the like in which thermal image processing device 100 is used. In the former case, for example, inputter 15 is connected to communicate with the operation panel or the like of the device in which thermal image processing device 100 is used, and receives the inputs of the first temperature and the second temperature from the user via the operation panel. In the description of the present embodiment, inputter 15 is assumed to receive the inputs of the first temperature and the second temperature from the user via the remote controller of air conditioning device 201.

Outputter 16 is a processor for outputting information of the thermal image and the like generated by thermal image processing device 100. Specifically, outputter 16 generates at least one of an image and temperature data to be displayed on display device 102. Outputter 16 transmits the generated image and temperature data to display device 102 via the communication module.

Each of acquirer 11, first processor 12, second processor 13, third processor 14, inputter 15, and outputter 16 described above is realized as a result of a processing program corresponding thereto being executed by a processor or a dedicated circuit and a memory.

Figure 5:
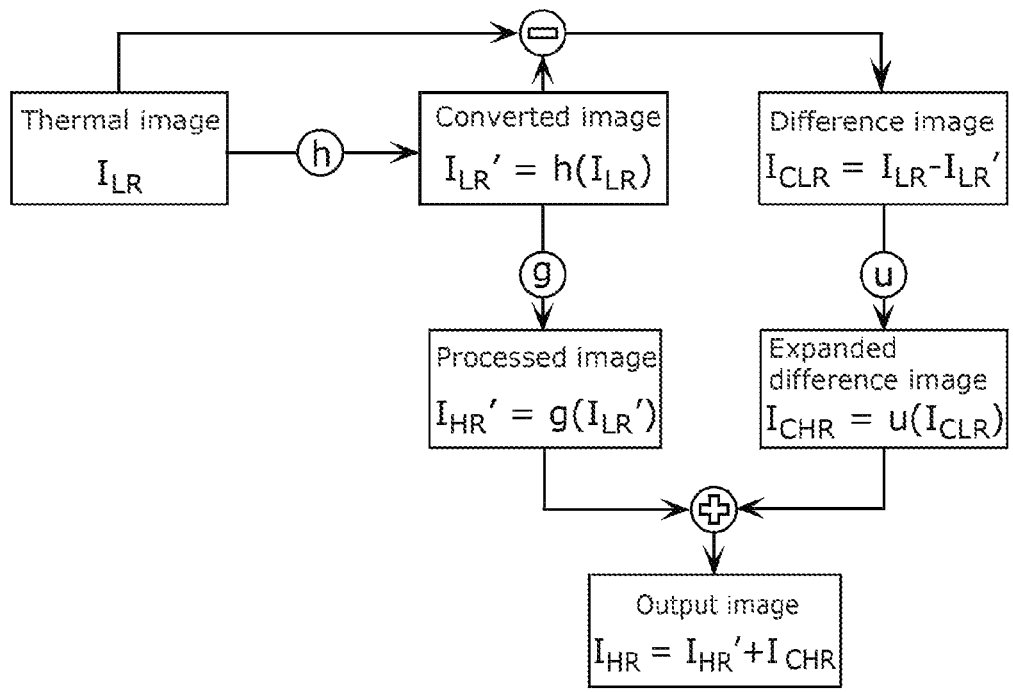
FIG. 5 is a schematic view illustrating processing on a thermal image in the embodiment.

Here, a processing flow for generating the output image from the thermal image in the present disclosure will be described with reference to FIG. 5. FIG. 5 is a schematic view illustrating processing on the thermal image in the embodiment. In FIG. 5, each image is represented by a rectangle, and processing on the image is represented by a circle including a symbol.

As shown in FIG. 5, thermal image processing device 100 first inputs acquired thermal image $I_{LR}$ to image processing of temperature conversion which is represented by symbol h and is performed by first processor 12 so as to generate converted image $I_{LR}'$. In other words, $I_{LR}'=h(I_{LR})$. Thermal image processing device 100 further inputs generated converted image $I_{LR}'$ to high frequency enhancement processing which is represented by symbol g and is performed by second processor 13 so as to generate processed image $I_{HR}'$. In other words, $I_{HR}'=g(I_{LR}')$. The high frequency enhancement processing here may be super-resolution processing in which processing for expanding a spatial resolution is also performed. In other words, second processor 13 may further perform the super-resolution processing for expanding the spatial resolution of converted image $I_{LR}'$.

On the other hand, third processor 14 uses thermal image $I_{LR}$ and converted image $I_{LR}'$ to generate difference image $I_{CLR}$ from a difference therebetween. In other words, $I_{CLR}=I_{LR}-I_{LR}'$. Here, when the super-resolution processing is performed in the processing represented by symbol g, since processed image $I_{HR}'$ differs from difference image $I_{CLR}$ in resolution, compensation processing (addition) cannot be directly performed. Hence, in such a case, known resolution complement processing such as bicubic, bilinear, nearest, or neighbour needs to be performed on difference image $I_{CLR}$. Hence, third processor 14 further inputs difference image $I_{CHR}$ to resolution complement processing represented by symbol u to generate expanded difference image $I_{CHR}$. In other words, $I_{CHR}=u(I_{CLR})$. Processed image $I_{HR}'$ and expanded difference image $I_{CHR}$ generated in this way are added to generate output image $I_{HR}$. In other words, $I_{HR}=I_{HR}'+I_{CHR}$.

When only the high frequency enhancement processing is performed in the processing represented by symbol g, the resolution complement processing as described above is not essential. When only temperatures between the first temperature and the second temperature are needed, and temperatures outside the range are not needed, a series of processing steps from the generation of difference image $I_{CLR}$ to the compensation processing and third processor 14 are not needed. In other words, as the minimum configuration, the processing in first processor 12 and the processing in second processor 13 are preferably performed. The processing of the minimum configuration will be described in more detail with reference to FIG. 6. FIG. 6 is a flowchart showing a thermal image processing method according to the embodiment.

As shown in FIG. 6, in the processing on the thermal image in the present embodiment, an acquisition step of acquiring the thermal image is first performed (step S101). A graph shown in each step in the figure indicates brightness values in the positions of pixels on line A-A shown in FIG. 3. The first temperature and the second temperature which are previously set are shown, and pixel $x_1$ indicating temperature $y_1$ in the temperature range between the first temperature and the second temperature and pixel $x_2$ indicating a temperature $y_2$ outside the temperature range are also shown.

Then, first processor 12 performs a first processing step (step S102) of performing, on the acquired thermal image, image processing for decreasing the temperature indicated by the high temperature pixel and increasing the temperature indicated by the low temperature pixel. The details of the processing in the first processing step are the same as in the description of first processor 12, and thus the description thereof is omitted. By the processing in the first processing step, temperature $y_1$ of pixel $x_1$ in the temperature range remains the same, and temperature $y_2'$ of pixel $x_2$ outside the temperature range differs from original temperature $y_2$. Specifically, pixel $x_2$ indicating temperature $y_2$ is a high temperature pixel, and thus its temperature is converted to temperature $y_2'$.

Then, second processor 13 performs a second processing step (step S103) of performing the high frequency enhancement processing on the converted image on which the image processing of temperature conversion as described above has been performed. The details of the processing in the second processing step are the same as in the description of second processor 13, and thus the description thereof is omitted. As described above, in the processed image after the high frequency enhancement processing, the occurrence of the ringing is suppressed, and the brightness values of pixels are converted to values close to the actual conditions.

Here, by the setting of the first temperature and the second temperature, in the temperature range where accuracy is required from the application of the thermal image, the high frequency enhancement processing is performed while the original brightness values are maintained, with the result that the accuracy of temperatures in the temperature range between the first temperature and the second temperature in the processed image is kept constant. Since as described above, the occurrence of the ringing is suppressed, and variations in the brightness values of pixels around a gradient portion are suppressed, the accuracy of temperatures is kept constant from this point of view. Hence, in thermal image processing device 100 or the thermal image processing module according to the present disclosure, an appropriate thermal image is generated in which the accuracy of temperatures is kept constant in the temperature range where accuracy is required from the application of the thermal image.

Figure 7A:
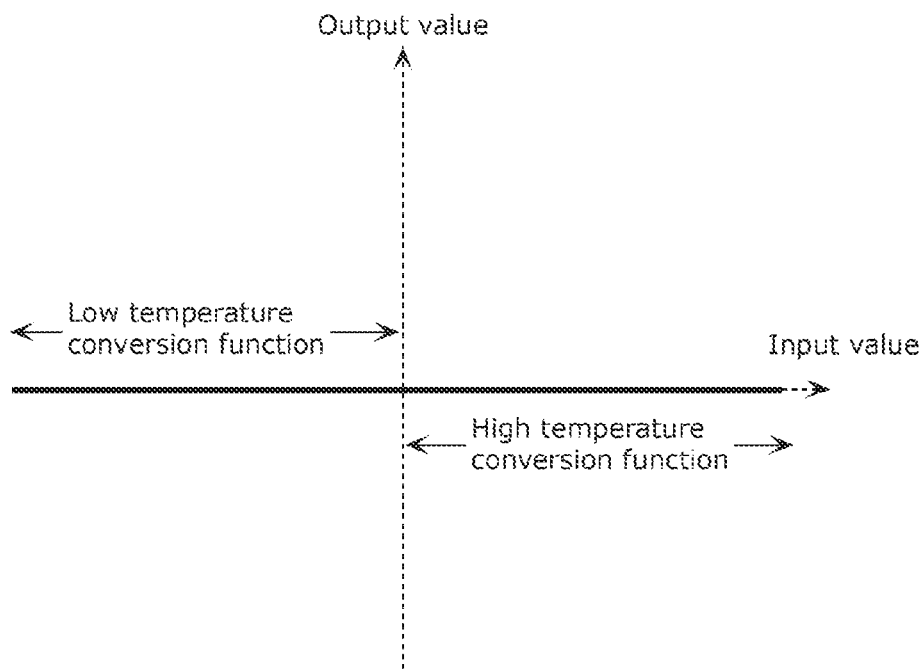
FIG. 7A is a diagram showing a first example of a conversion function in the embodiment.
Figure 7B:
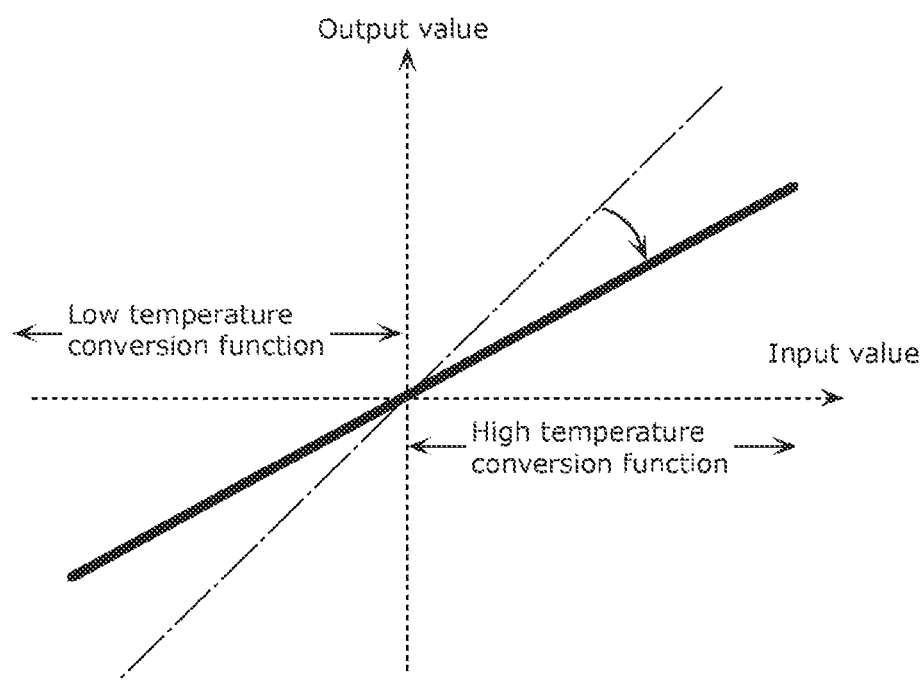
FIG. 7B is a diagram showing a second example of the conversion function in the embodiment.
Figure 7C:
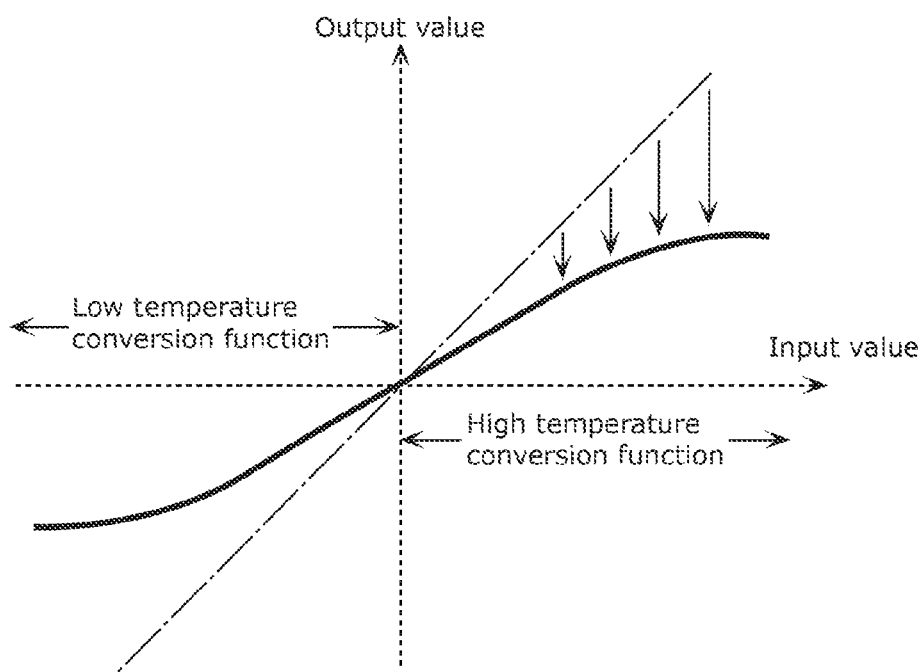
FIG. 7C is a diagram showing a third example of the conversion function in the embodiment.
Figure 7D:
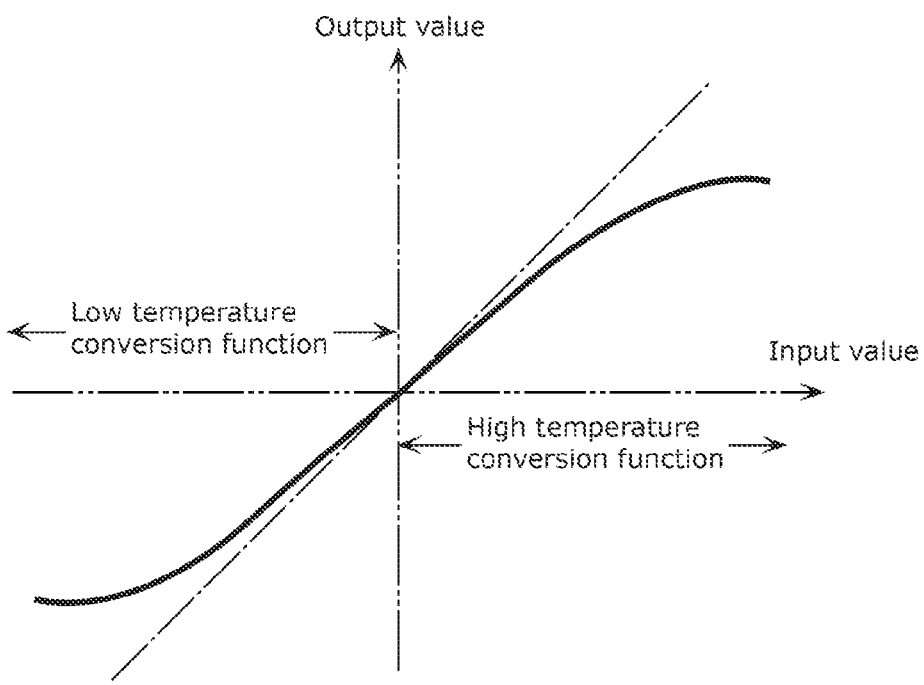
FIG. 7D is a diagram showing a fourth example of the conversion function in the embodiment.

The high temperature conversion algorithm and the low temperature conversion algorithm will be further described below. FIG. 7A is a diagram showing a first example of a conversion function in the embodiment. FIG. 7B is a diagram showing a second example of the conversion function in the embodiment. FIG. 7C is a diagram showing a third example of the conversion function in the embodiment. FIG. 7D is a diagram showing a fourth example of the conversion function in the embodiment.

In thermal image processing device 100, the high temperature conversion algorithm and the low temperature conversion algorithm (hereinafter also collectively referred to as the temperature conversion algorithm) are realized as conversion functions to which continuous values can be input. For example, in the temperature conversion algorithms in FIGS. 7A to 7D, functions are shown in which a high temperature difference value and a low temperature difference value calculated in a high temperature pixel and a low temperature pixel are input as input values. In FIGS. 7A to 7D, on x-y two-dimensional coordinate axes where the horizontal axis (x axis) represents an input value and a vertical axis (y axis) represents an output value, a relationship between the input value and the output value is shown. Here, when the input value is a high temperature difference value, the output value is added to the first temperature whereas when the input value is a low temperature difference value, the output value is added to the second temperature. In other words, in the temperature conversion algorithms, new difference values which replace difference values that are input are output.

The positive side of the input value corresponds to a high temperature difference value whose difference value is positive, and is described as a high temperature conversion function. The negative side of the input value corresponds to a low temperature difference value whose difference value is negative, and is described as a low temperature conversion function. In the following description, the high temperature conversion function and the low temperature conversion function are also collectively referred to as the conversion function. Although a point which connects the high temperature conversion function and the low temperature conversion function and in which the input value is 0 is added for convenience, and these conversion functions are described as a series of functions, the high temperature conversion function and the low temperature conversion function each may be different functions.

In the present disclosure, when a function for decreasing the original temperature of a high temperature pixel and increasing the original temperature of a low temperature pixel is provided, the effects described above can be achieved. Specifically, a function is preferably provided in which, as compared with a linear function having a slope of 1, the function passes through a low temperature range in the first quadrant and passes through a high temperature range in the third quadrant. When in a conversion function, a negative value is output for a positive input value and a positive value is output for a negative input value, since values outside a temperature range are subjected to the image processing of temperature conversion so as to fall into the temperature range, they need to be prevented. Each of the functions shown in FIGS. 7A to 7D satisfies this condition. As long as the condition described above is satisfied, another function may be adopted.

As shown in FIG. 7A, the first example of the conversion function is represented by formula 1 below.

[Math. 1]

$$y=f(x), f(x)=0 \quad \text{(formula 1)}$$

In formula 1 above, even when any value is input, 0 is output as the output value. Hence, in the pixel which indicates the temperature higher than the first temperature, the temperature is fixed to the first temperature. In the pixel which indicates the temperature lower than the second temperature, the temperature is fixed to the second temperature.

As shown in FIG. 7B, the second example of the conversion function is represented by formula 2 below.

[Math. 2]

$$y=f(x), f(x)=ax, (0<a<1) \quad \text{(formula 2)}$$

In formula 2 above, the output value is linearly changed according to the input value. Hence, in the pixel which indicates the temperature higher than the first temperature, the temperature is converted to the original temperature corresponding to the observed value. In the pixel which indicates the temperature lower than the second temperature, the temperature is converted to the original temperature corresponding to the observed value.

As shown in FIG. 7C, the third example of the conversion function is represented by formula 3 below.

[Math. 3]

$$y = f(x), f(x) = \frac{1}{1+e^{-ax}} - \frac{1}{2}, \quad \text{(formula 3)}$$

$$(0 < a \leq 4)$$

In formula 3 above, the output value is curvilinearly changed according to the input value. Hence, in the pixel which indicates the temperature higher than the first temperature, the temperature is converted to the original temperature corresponding to the observed value. In the pixel which indicates the temperature lower than the second temperature, the temperature is converted to the original temperature corresponding to the observed value.

As shown in FIG. 7D, the fourth example of the conversion function is represented by formula 4 below.

[Math. 4]

$$y = f(x), f(x) = \frac{b}{1+e^{-ax}} - \frac{b}{2}, \quad \text{(formula 4)}$$

$$(b \neq 1, 0 < ab \leq 4)$$

In formula 4 above, the output value is curvilinearly changed according to the input value. Hence, in the pixel which indicates the temperature higher than the first temperature, the temperature is converted to the original temperature corresponding to the observed value. In the pixel which indicates the temperature lower than the second temperature, the temperature is converted to the original temperature corresponding to the observed value. The image processing of temperature conversion may be performed without use of the function as described above. Specifically, the temperature conversion algorithm may be a conversion table in which the value that is input is associated with the value that is output. First processor 12 may reference, based on the input value, the conversion table as described above to obtain the output value. For example, this method can be used when the observed temperature range is limited and temperatures serving as brightness values are obtained as discrete values such as 1° C. increments.

Here, with reference to FIGS. 8 and 9, the image processing in the temperature range using the conversion functions in FIGS. 7A and 7D will be described. FIG. 8 is a first diagram illustrating the image processing in the embodiment. FIG. 9 is a second diagram illustrating the image processing in the embodiment. In FIGS. 8 and 9, graphs corresponding to the graphs in the steps of the flowchart shown in FIG. 6 are shown in (a) to (c) in each of the figures.

For example, as described above, in the example shown in FIG. 8 using the conversion function of FIG. 7A, in the pixel which indicates the temperature higher than the first temperature, the temperature is fixed to the first temperature, and in the pixel which indicates the temperature lower than the second temperature, the temperature is fixed to the second temperature. Hence, a converted image which is generated has a table-shaped plane, and the accuracy of temperatures outside the temperature range between the first temperature and the second temperature is not maintained. However, since a calculation load is small, thermal image processing device 100 can be realized even by using, for example, a processor having a relatively low processing capacity.

On the other hand, for example, as described above, in the example shown in FIG. 9 using the conversion function of FIG. 7D, in the pixel which indicates the temperature higher than the first temperature, the temperature is converted to the original temperature corresponding to the observed value. In the pixel which indicates the temperature lower than the second temperature, the temperature is converted to the original temperature corresponding to the observed value. Hence, in a converted image which is generated, a shape close to the original thermal image is maintained, and the amplitude of the temperature is suppressed. The temperatures of pixels around the first temperature are smoothly connected even after the image processing of temperature conversion, and thus a portion in which a temperature change is bent by the image processing is suppressed to be newly produced.

Figure 10:
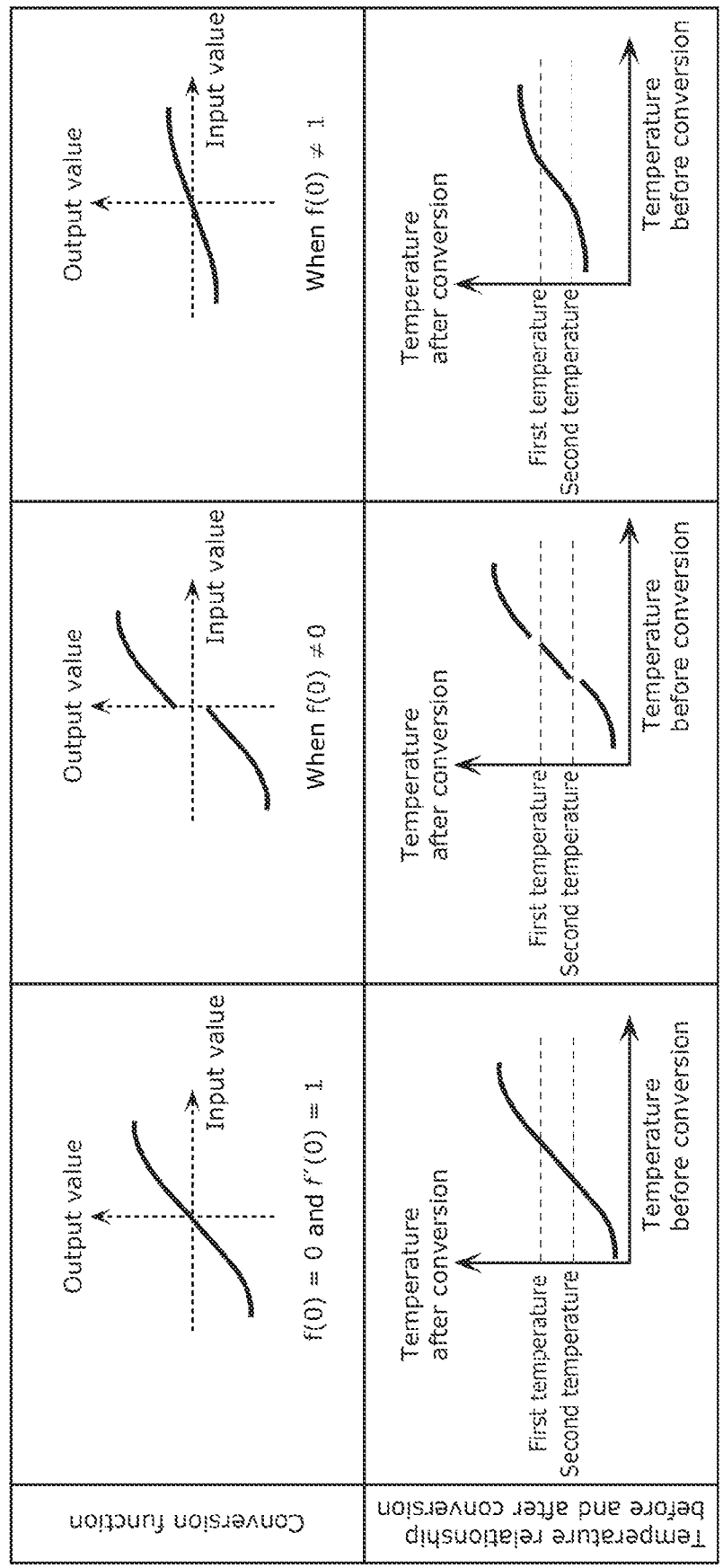
FIG. 10 is a diagram illustrating the conversion function in the embodiment.

With consideration given to what has been described, the conditions of a function suitable as the conversion function will be described with reference to FIG. 10. FIG. 10 is a diagram illustrating the conversion function in the embodiment. FIG. 10 shows three examples of the conversion function which are a suitable example (left column) and unsuitable examples (center and right columns), and also shows a relationship between temperatures before and after being converted by the image processing of temperature conversion in each of the cases.

As shown in FIG. 10, in the function suitable as the conversion function, when the input value is 0, the output value is 0 (f(0)=0). When the difference value which is input is 0, the output value is 0, and thus after the image processing, values in a temperature conversion boundary between the first temperature and the second temperature can be suppressed to be discrete. When this is not the case (f(0)≠0), the values in the temperature conversion boundary between the first temperature and the second temperature are discrete, with the result that a high frequency component is newly included in the converted image.

As shown in FIG. 10, in the function suitable as the conversion function, when the input value is 0, the derivative value of the output value is 1 (f'(0)=1). Specifically, the tangent slope of the function in a portion in which the differential value that is input is 0 is 1, and thus it is possible to suppress, after the image processing, a rapid change in the values in the temperature conversion boundary between the first temperature and the second temperature. When this is not the case (f'(0)≠1), the values in the temperature conversion boundary between the first temperature and the second temperature are rapidly changed, with the result that a high frequency component is newly included in the converted image.

Other Embodiments

Although the thermal image processing device and the like according to the present disclosure have been described above based on the embodiment described above, the present disclosure is not limited to the embodiment and variations described above. For example, embodiments obtained by performing various types of variations conceived on the embodiment described above by a person skilled in the art and embodiments realized by arbitrarily combining constituent elements and functions in the embodiment and the like without departing from the spirit of the present disclosure are also included in the present disclosure.

For example, processing which is performed by a specific processor in the embodiment described above may be performed by another processor. The order of a plurality of types of processing may be changed or a plurality of types of processing may be performed simultaneously.

The thermal image processing device and the like according to the present disclosure may be realized by a plurality of devices each of which includes part of a plurality of constituent elements or may be realized by a single device which includes all of the constituent elements. Part of the function of a constituent element may be realized as the function of another constituent element, and there is no limitation on how the functions are allocated to the constituent elements. Embodiments which have a configuration including all functions capable of substantially realizing the thermal image processing device and the like according to the present disclosure are included in the present disclosure.

In the embodiment described above, the constituent elements may be realized by executing software programs suitable for the constituent elements. A program executor such as a CPU or a processor may read and execute software programs recorded in a recording medium such as a hard disk or a semiconductor memory so as to realize the constituent elements.

The constituent elements may be realized by hardware. For example, the constituent elements may be circuits (or integrated circuits). These circuits may form one circuit as a whole or these circuits each may be different circuits. Each of these circuits may be a general-purpose circuit or a dedicated circuit.

General or specific embodiments of the present disclosure may be realized by a system, a device, a method, an integrated circuit, computer programs, or a computer-readable recording medium such as a CD-ROM. The general or specific embodiments may be realized by any combination of a system, a device, a method, an integrated circuit, computer programs, and a recording medium.

Although in the embodiment discussed above, the example is described where the first temperature and the second temperature are used to set the temperature range to which the image processing of temperature conversion is applied, a temperature range to which the image processing of temperature conversion is applied by using only the first temperature may be set. For example, as the application of the acquired thermal image, an application for detecting a human body in a living room or the like is considered. In such an application, an extremely low temperature portion which causes ringing is seldom included, and thus the second temperature does not need to be set. On the other hand, in such an application, it is easily assumed that extremely high temperature portions such as a stove, a lamp, and a heater are included, and thus it is useful to set the first temperature. As described above, the second temperature is not essential, and may be set as necessary according to the conditions.

The first temperature and the second temperature may be set by receiving inputs of individual values. On the other hand, as described above, the first temperature and the second temperature can be estimated to some extent as general values corresponding to the application. Hence, for convenience of the user, the thermal image processing device may set both the first temperature and the second temperature by receiving a selection of a combination of the first temperature and the second temperature which is previously prepared. Examples of the combination of the first temperature and the second temperature will be described with reference to FIG. 11. FIG. 11 is a diagram showing examples of the combination of the first temperature and the second temperature in the embodiment.

When as shown in FIG. 11, the application of a device or the like incorporating the thermal image processing device is, for example, a "living room mode" for detecting a spatial temperature in a living room by use of a thermal image, a combination of a first temperature of 40° C. and a second temperature of 20° C. is a combination for a general living room. For example, when the application is a "vehicle interior mode" for detecting a spatial temperature in a vehicle interior by use of a thermal image, a combination of a first temperature of 50° C. and a second temperature of 10° C. is a combination for a general vehicle interior. For example, when the application is a "person detection mode" for detecting a person in a space by use of a thermal image, a combination of a first temperature of 40° C. and a second temperature of 32° C. is a combination for a human body temperature.

Preferably, for example, the choices of such combinations are displayed on the display device installed in the remote controller of the air conditioning device, and one combination is selected by operating the remote controller.

In addition, an "unconstrained mode" for releasing the setting of the first temperature and the second temperature may be provided. As described above, in the setting of the first temperature and the second temperature, the first temperature and the second temperature may be set according to one combination selected from a plurality of combinations of the first temperature and the second temperature. Even when as described above, only the first temperature is used without the second temperature being set, as in the "living room mode", the user may set the first temperature by selecting an application from applications which are displayed.

Although in the description of the embodiment discussed above, the display device is installed in the remote controller of the air conditioning device, this function may be realized by a portable terminal such as a PC, a smartphone, or a tablet terminal. This function may also be realized by an application for realizing the function on the portable terminal. In other words, the processing function of the thermal image processing device may be performed by a processor included in the portable terminal.

For example, when a thermal image is used only for internal processing in a device, since a display device is not essential, a thermal image processing module which does not include a display device and includes only a thermal image sensor and a thermal image processing device may be realized.

INDUSTRIAL APPLICABILITY

The thermal image processing device and the like according to the present disclosure can be utilized for a device and the like in which an acquired thermal image is used to change the form of an operation or the like.

The invention claimed is:

1. A thermal image processing device comprising:
an acquirer that acquires a thermal image from a thermal image sensor;
a first processor that performs, on a high temperature pixel indicating a temperature higher than a first temperature among a plurality of pixels included in the thermal image acquired, image processing for decreasing the temperature indicated by the high temperature pixel; and
a second processor that performs high frequency enhancement processing for enhancing a high frequency component included in a converted image, the converted image being the thermal image on which the image processing has been performed.

2. The thermal image processing device according to claim 1,
wherein in the image processing, the first processor further increases, on a low temperature pixel indicating a temperature lower than a second temperature among the plurality of pixels included in the thermal image acquired, the temperature indicated by the low temperature pixel, the second temperature being lower than the first temperature.

3. The thermal image processing device according to claim 2, further comprising:
an inputter through which at least one of the first temperature and the second temperature is set.

4. The thermal image processing device according to claim 3,
wherein in setting the at least one of the first temperature and the second temperature, the first temperature and the second temperature are set according to one combination selected from a plurality of combinations of the first temperature and the second temperature.

5. The thermal image processing device according to claim 2,
wherein in the image processing:
a low temperature difference value is calculated by subtracting the second temperature from the temperature indicated by the low temperature pixel among the plurality of pixels included in the thermal image; and
using a low temperature conversion algorithm that outputs a value higher than a value which is input, the temperature indicated by the low temperature pixel is converted using a value which is output as a result of the low temperature difference value being input to the low temperature conversion algorithm.

6. The thermal image processing device according to claim 1,
wherein in the image processing:
a high temperature difference value is calculated by subtracting the first temperature from the temperature indicated by the high temperature pixel among the plurality of pixels included in the thermal image; and
using a high temperature conversion algorithm that outputs a value lower than a value which is input, the temperature indicated by the high temperature pixel is converted using a value which is output as a result of the high temperature difference value being input to the high temperature conversion algorithm.

7. The thermal image processing device according to claim 5,
wherein in the image processing:
a high temperature difference value is calculated by subtracting the first temperature from the temperature indicated by the high temperature pixel among the plurality of pixels included in the thermal image; and
using a high temperature conversion algorithm that outputs a value lower than a value which is input, the temperature indicated by the high temperature pixel is converted using a value which is output as a result of the high temperature difference value being input to the high temperature conversion algorithm, and
each of the low temperature conversion algorithm and the high temperature conversion algorithm is a conversion function to which continuous values can be input.

8. The thermal image processing device according to claim 5,
wherein in the image processing:
a high temperature difference value is calculated by subtracting the first temperature from the temperature indicated by the high temperature pixel among the plurality of pixels included in the thermal image; and
using a high temperature conversion algorithm that outputs a value lower than a value which is input, the temperature indicated by the high temperature pixel is converted using a value which is output as a result of the high temperature difference value being input to the high temperature conversion algorithm, and
each of the low temperature conversion algorithm and the high temperature conversion algorithm is a conversion table in which input values are associated with output values.

9. The thermal image processing device according to claim 7,
wherein in the conversion function, when the value input is 0, the value output is 0, and when the value input is 0, a derivative value of the value output is 1.

10. The thermal image processing device according to claim 1, further comprising:
a third processor that performs compensation processing including:
calculating a difference image by calculating a difference between corresponding pixels of the acquired thermal image and the converted image; and
adding corresponding pixels of the converted image on which the high frequency enhancement processing has been performed and the calculated difference image together.

11. The thermal image processing device according to claim 1, wherein the second processor further performs super-resolution processing for expanding a spatial resolution of the converted image.

12. A thermal image processing module comprising:
the thermal image sensor; and
the thermal image processing device according to claim 1.

13. The thermal image processing module according to claim 12, further comprising:
a display device that displays the converted image on which the high frequency enhancement processing has been performed as at least one of an image and temperature data.

14. A thermal image processing method comprising:
acquiring a thermal image from a thermal image sensor;
performing, on a high temperature pixel indicating a temperature higher than a first temperature among a plurality of pixels included in the thermal image acquired, image processing for decreasing the temperature indicated by the high temperature pixel; and
performing high frequency enhancement processing for enhancing a high frequency component included in a converted image, the converted image being the thermal image on which the image processing has been performed.

15. A non-transitory computer-readable recording medium having a program recorded thereon for causing a computer to execute the thermal image processing method according to claim 14.

* * * * *